United States Patent [19]

Taylor et al.

[11] 4,315,896

[45] Feb. 16, 1982

[54] RECOVERY OF MOLYBDENUM AS AN AQUEOUS SOLUTION FROM SPENT CATALYST

[75] Inventors: Paul D. Taylor, Flemington; Michael T. Mocella, East Windsor, both of N.J.

[73] Assignee: Atlantic Richfield Company, Los Angeles, Calif.

[21] Appl. No.: 226,967

[22] Filed: Jan. 21, 1981

[51] Int. Cl.³ .............................................. C01G 39/00
[52] U.S. Cl. ........................................ 423/54; 423/53; 252/414; 252/420
[58] Field of Search .................................. 423/53–55; 252/414, 420

[56] References Cited

U.S. PATENT DOCUMENTS 3,763,303 10/1973 Khuri et al. ............................ 423/54
3,931,044 1/1976 Maurin ................................ 252/414

FOREIGN PATENT DOCUMENTS 721853 6/1973 Netherlands ........................... 423/54
1317480 5/1973 United Kingdom ................... 423/54
633811 11/1978 U.S.S.R. ................................ 423/54

*Primary Examiner*—Herbert T. Carter
*Attorney, Agent, or Firm*—Michael S. Jarosz

[57] ABSTRACT

The process of separating components of a crude reaction mixture obtained from a molybdenum-catalyzed hydroperoxide epoxidation of an olefin wherein the product epoxide and an alcohol corresponding to the hydroperoxide used are removed from the reaction mixture leaving a spent catalyst solution and subjecting the spent catalyst solution to a liquid-to-liquid solvent extraction to separate dissolved molybdenum values is improved by solvent extracting the spent catalyst solution with an extracting medium consisting essentially of water and a water immiscible organic solvent to form a two phase system and then separating the molybdenum-rich aqueous phase extract from the organic phase extract. The molybdenum-rich aqueous phase extract may be treated to recover the molybdenum as a solid or the extract may be treated to obtain an active molybdenum catalyst suitable for reuse as a catalyst in a hydroperoxide epoxidation reation.

10 Claims, No Drawings

RECOVERY OF MOLYBDENUM AS AN AQUEOUS SOLUTION FROM SPENT CATALYST

BACKGROUND OF THE INVENTION

Oxirane compounds such as ethylene oxide, propylene oxide, and their higher homologs are valuable articles of commerce. One of the most attractive processes for synthesis of those oxirane compounds is described by Kollar in U.S. Pat. No. 3,351,635. According to Kollar, the oxirane compound (e.g., propylene oxide) may be prepared by epoxidation of an olefinically unsaturated compound (e.g., propylene) by use of an organic hydroperoxide and a suitable catalyst such as molybdenum.

During the epoxidation reaction the hydroperoxide is converted almost quantitatively to the corresponding alcohol. That alcohol may be recovered as a coproduct with the oxirane compound. However, it is the oxirane which is of primary concern.

Kollar teaches that oxirane compounds may be prepared from a wide variety of olefins. Lower olefins having three or four carbon atoms in an aliphatic chain are advantageously epoxidized by the process. The class of olefins commonly termed alpha olefins or primary olefins are epoxidized in a particularly efficient manner by the process. It is known to those in the art that primary olefins, e.g., propylene, butene-1, decene-1 hexadecene-1 etc., are much more difficultly epoxidized than other forms of olefins, excluding only ethylene. Other forms of olefins which are much more easily epoxidized are substituted olefins, alkenes with internal unsaturation, cycloalkenes and the like. Kollar teaches that notwithstanding the relative difficulty in epoxidizing primary olefins, epoxidation proceeds more efficiently when molybdenum, titanium or tungsten catalysts are used. Molybdenum is of special interest. Kollar teaches that activity of those metals for epoxidation of the primary olefins is surprisingly high and can lead to high selectivity of propylene to propylene oxide. These high selectivities are obtained at high conversions of hydroperoxide (50% or higher) which conversion levels are important for commercial utilization of the technology.

Kollar's epoxidation reaction proceeds under pressure in the liquid state and, accordingly, a liquid solution of the metal catalyst is preferred. Preparation of a suitable catalyst is taught by Sheng et al in U.S. Pat. No. 3,434,975. According to Sheng, the reaction-medium soluble epoxidation catalyst may be prepared by reacting molybdenum metal with an organic hydroperoxide, per acid or hydrogen peroxide in the presence of a saturated alcohol having one to four carbon atoms.

When propylene is epoxidized with tertiary-butyl hydroperoxide according to the Kollar process using the Sheng catalyst, a product mixture containing unreacted propylene, propylene oxide, tertiary-butyl alcohol and molybdenum catalyst is obtained. Distillation of that product mixture provides substantially pure propylene oxide and tertiary-butyl alcohol. The residue of distillation (hereafter "TBA bottoms") contains spent molybdenum catalyst as well as high boiling organic residues.

Removal and recovery of the molybdenum values from the distillation residue are important from ecological and economical standpoints. In U.S. Pat. No. 3,763,303 Khuri et al disclose two embodiments of a process for recovering molybdenum values from spent epoxidation catalysts. The Khori process first embodiment involves recovery of molybdenum directly from the spent catalyst mixture by a liquid-to-liquid extraction utilizing an aqueous extractant consisting essentially of water which is intermittently admixed with the residue to be treated to effect an extraction and transfer of a portion of the molybdenum constituent from the organic phase to the aqueous phase. Untreated spent catalyst solutions usually contain molybdenum in concentrations of from about 0.1% to about 1.0% by weight and Khori discloses those solutions are highly satisfactory for treatment in the liquid-to-liquid extraction process in which the extractant consists essentially of water to effect molybdenum separation. Molybdenum separated with the aqueous extract is recovered as molybdenum trioxide by evaporation of water followed by calcination of the solid obtained by extract evaporation.

The second embodiment of the Khuri process relates to extracting molybdenum from distillation residues obtained from distillation of spent catalyst solution (TBA bottoms) but the extraction is performed with acids or bases to convert the molybdenum into a recoverable molybdenum compound of the acid or base.

British Patent Specification No. 1,317,480 also teaches recovery of molybdenum values from spent epoxidation catalysts. As in Khuri, the British recovery process involves extracting the spent catalyst solution with water alone or with aqueous ammonia. The British extraction process results in a transfer of at least 95% of the available molybdenum values to the aqueous extract. Those molybdenum values are recovered from the aqueous phase by precipitation as a phosphomolybdate or by distillative stripping of the volatile organic material and water from the extract.

The spent catalyst solution may also be subjected to exhaustive evaporation or distillation to produce a residue with a higher molybdenum content as taught by Levine et al in U.S. Pat. No. 3,819,663. The Levine process starts with a spent catalyst solution such as TBA bottoms and subjects that solution to a wiped film evaporation at 375° to 450° F. until 60 to 80% by weight of the solution is evaporated overhead. The residue of that evaporation is taught to be useful as a catalyst in further epoxidation processes.

Khcheyan et al in U.S.S.R. Author's Certificate No. 419,238 discloses that molybdenum values may be recovered from an olefin epoxidation reaction by extracting the reaction product with an aqueous solution of an alkaline agent and an organic extractant. The examples disclosed by Khcheyan relate to direct treatment of the epoxidation reaction product from which only the propylene oxide product appears to have been removed. It has been found that when both propylene oxide and tertiary-butyl alcohol are distilled from the reaction product, the distillation residue cannot be successfully treated according to the Khcheyan method to recover molybdenum values.

SUMMARY OF THE INVENTION

It has been discovered that extraordinarily high levels of dissolved molybdenum can be extracted from spent epoxidation catalyst solutions with a one-step aqueous liquid-to-liquid extraction which is conducted with water in the presence of an added organic cosolvent for the organic portion of the spent catalyst solution. As used in the present specification and the annexed claims, the term "spent catalyst solution" is intended to mean that fraction of the epoxidation reaction product effluent remaining after removal of unreacted olefin (for example, propylene), alkylene oxide (for example, propylene oxide) and a major portion of the alcohol corresponding to the hydroperoxide (for example, tertiary butyl hydroperoxide) used in the epoxidation reaction which reaction may be according to the procedure of Kollar, the teachings of which are hereby incorporated by reference in their entirity. Spent catalyst solution, apart from molybdenum compounds, contains some alcohol, acids and other low molecular weight oxygenated compounds and said spent catalyst solution is generally not subjected to any chemical treatment before being subjected to the process of the present invention. It is contemplated that spent catalyst solution as used herein includes both the distillation bottoms treated in British Patent Specification No. 1,317,480 and the residue obtained from the wiped film evaporation process according to Levine and said spent catalyst solution can contain molybdenum compounds at levels of up to 5% by weight.

One object of this invention is to provide a more efficient and economical method for removal of dissolved molybdenum catalysts from spent epoxidation catalyst solutions. By the present process the transfer of molybdenum values into the aqueous phase extract is so large that the remaining organic phase from the extraction contains less than 100 parts per million of molybdenum.

Another object of the invention is to provide a process for substantially complete transfer of dissolved molybdenum into the aqueous extract phase with a single extraction. Because only a single extraction is required in the present process to achieve suitable molybdenum transfer, less total water is required for molybdenum recovery which has the advantage of eliminating successive extractions and treatment of large volumes of water which requires greater expense for added equipment necessary.

Still another object of the invention is to provide a process whereby the organic part of the spent catalyst solution is substantially freed of molybdenum, rendering the organic portion suitable for use or sale as a fuel.

Yet another object of this invention is to provide a process for obtaining an aqueous solution of molybdenum from a spent catalyst solution which aqueous solution can be treated to obtain an active molybdenum catalyst suitable for reuse in epoxidation reactions. That aqueous solution can also be the source of other organic materials extracted from the spent catalyst solution by water.

Additional specific benefits and advantages arising from practice of this method will become apparent from the following description of the method.

DETAILED DESCRIPTION OF THE INVENTION

It has been discovered that the process of separating the components of a reaction mixture obtained from epoxidizing an olefin with an organic hydroperoxide in the presence of a liquid molybdenum catalyst wherein the product epoxide and an alcohol corresponding to the hydroperoxide employed are removed from the reaction mixture leaving a spent catalyst solution may be further extended by subjecting the spent catalyst solution to a liquid-to-liquid solvent extraction to separate dissolved molybdenum values by solvent extracting with an extracting medium consisting essentially of water and a water immiscible organic solvent, and then separating the molybdenum-rich aqueous phase extract from the organic phase extract. Molybdenum in solution may then be recovered from the aqueous solution by a variety of methods known to those in the art.

More specifically the advantage of the present process lies in recovering dissolved molybdenum by extraction from a spent catalyst solution obtained when epoxide and alcohol are distilled from a crude reaction mixture of a molybdenum catalyzed epoxidation reaction, wherein the distillation residue is subjected to a liquid-to-liquid solvent extraction with an extracting medium consisting essentially of water and a water immiscible organic solvent to form a two phase extraction system and then separating the molybdenum-rich aqueous phase extract from the organic phase extract.

This invention provides a means for efficiently separating molybdenum from spent catalyst streams into an aqueous solution of the molybdenum values. That aqueous solution may be treated to produce solid molybdenum compounds according to the teachings of Khuri. Also, the aqueous solution produced by this invention provides a molybdenum epoxidation catalyst may be produced according to the process of our copending application entitled "Production of Active Molybdenum Catalyst" (Ser. No. 226,969) filed concurrently herewith.

The aqueous extraction of dissolved molybdenum from the spent catalyst solutions is achieved by intimately mixing the residue of a distillation with the extraction medium for about several seconds to 30 minutes, preferably 1 to 15 minutes, at a temperature of about 20° C. to 130° C., with the preferred temperatures being from 50° to 90° C. Longer extraction times may be employed although little additional transfer of molybdenum values into the aqueous extract is seen. Temperatures lower than 20° C. offer no advantage in molybdenum transfer whereas temperatures in excess of 130° C. may result in formation of solid materials which interferes with the extraction of molybdenum into the aqueous phase.

A suitable ratio of extracting medium to spent catalyst solution is in the range of about 0.25 to about 10 parts of extracting medium per part of spent catalyst solution by weight. The amount of extraction medium employed should be at least equal in weight to the spent catalyst solution from which molybdenum is extracted. The upper limit is not critical and is dictated by economics and convenience of handling.

The extraction medium is an admixture of water and a water immiscible organic solvent. Suitable organic solvents are hydrocarbons or halogenated hydrocarbons. More specifically, suitable saturated organic solvents are pentane, hexane, heptane, octane, dodecane, hydrocarbon mixtures or distillation fractions such as fuel oils, benzene, toluene, xylenes, alkyl substituted benzenes having 2 to 10 carbon atoms in the alkyl moiety and halogenated analogs thereof. Preferred are the saturated hydrocarbons and most preferred are the saturated hydrocarbons of 5 to 8 carbon atoms. The ratio of water to organic solvent in the extraction medium is from 1:20 to 20:1 parts by weight with the preferred ratio range being 1:4 to 4:1 parts by weight.

Extraction of dissolved molybdenum from a spent catalyst solution by this process affords an unexpectly high transfer of available molybdenum into the aqueous phase of the extraction medium. Indeed, the transfer of available molybdenum into the aqueous phase leaves an organic extract substantially free of molybdenum when the present procedure is followed. Transfer of substantially all the molybdenum values into the aqueous phase is important for both molybdenum recovery from the aqueous phase as well as for purification of the organic phase. The organic phase extract is itself an important commodity which can be sold as a fuel or burned directly as a fuel. However, in order to be useful for fuel purposes, the molybdenum level must be lower than about 250, and preferably lower than 100 parts per million molybdenum. Higher levels of molybdenum in the organic extract burned as fuel results in fouling of the furnace buring the fuel. As such frequent furnace downtime is necessitated for cleaning and repair. Also, levels of molybdenum higher than about 250 ppm may result in objectionable increases in environmental pollution. Prior art processes for separating molybdenum from the organic portion of spent catalyst solutions required exhaustive and extensive plural extractions in order to reduce the molybdenum content to below these levels. It has been surprisingly and unexpectedly been found that the present process yields an organic extract containing less than about 250, and preferably less than 100 ppm, molybdenum with only a single extraction.

For the aqueous extract itself, one advantage to having high levels of available molybdenum transfer into the aqueous phase is that less liquid need be treated to recover molybdenum resulting in lower costs of processing including both capital expenses and operating expenses.

In order to further illustrate the improved process of the present invention, the following examples are provided. It will be understood that the examples are merely illustrative and are not intended as being restrictive of the process.

EXAMPLES 1-8

An extraction medium of 12 grams of water and 12 grams of octane was heated to the desired extraction temperature. Thereupon, 12 grams of a molybdenum-containing spent catalyst solution, defined more particularly hereafter, was added to the extraction medium with vigorous stirring. After stirring for the desired extraction time, the mixture was cooled and centrifuged briefly to complete separation of the phases. The partitioning of the molybdenum between the phases was determined by analyzing its concentration in the aqueous and organic phases. The various extraction conditions and degree of molybdenum transfer were as follows:

| Example | Extraction Temp.(°C.) | Contact Time(Min.) | Percent Recovered Mo in aq. phase |
|---|---|---|---|
| 1 | 30 | 10 | 94 |
| 2 | 30 | 30 | 95 |
| 3 | 50 | 10 | 96 |
| 4 | 50 | 30 | 96 |
| 5 | 70 | 10 | 97 |
| 6 | 70 | 30 | 97 |
| 7 | 90 | 10 | 98 |
| 8 | 90 | 30 | 99 |

The spent catalyst solution treated in Examples 1-8 originally contained about 0.4% dissolved molybdenum by weight. The spent catalyst solution ("TBA bottoms") was obtained as the distillation bottoms resulting from distillation of propylene oxide and tertiary-butyl alcohol from a crude reaction product obtained from the molybdenum catalyzed epoxidation of propylene with tertiary-butyl hydroperoxide.

EXAMPLES 9-16 (COMPARISON)

Examples 1-8, respectively, were repeated except that the organic component of the extraction medium was omitted. Extraction of the molybdenum-containing TBA bottoms was conducted with equal amounts of water by weight with the conditions and results as follows:

| Example | Extraction Temp. (°C.) | Contact Time (Min.) | Percent Recovered Mo in aq. phase |
|---|---|---|---|
| 9 | 30 | 10 | 69 |
| 10 | 30 | 30 | 69 |
| 11 | 50 | 10 | 76 |
| 12 | 50 | 30 | 83 |
| 13 | 70 | 10 | 84 |
| 14 | 70 | 30 | 90 |
| 15 | 90 | 10 | 89 |
| 16 | 90 | 30 | 91 |

A comparison of Examples 1-8 with Examples 9-16, respectively, shows that the present process provides a significantly higher level of molybdenum transfer into the aqueous phase. Additionally, Examples 1-8 were qualitatively judged to have a better separation of the phases than observed in the simple aqueous extractions of Examples 9-16.

EXAMPLE 17

To a mixture of 12 grams each of octane and TBA bottoms (containing 3600 ppm molybdenum) heated to 70° C. was added 12 grams of water at 70° C. The solution was well mixed while maintained at 70° C. for 10 minutes. Once mixing ceased and the mixture began to cool, two layers formed quickly and cleanly. The recovered 17.7 grams of aqueous phase contained 2340 ppm molybdenum, while the 17.9 grams of organic phase contained 80 ppm molybdenum. Thus, 99% of the charged molybdenum was accounted for and 97% of the recovered molybdenum was in the aqueous phase.

EXAMPLES 18 AND 19

The same procedure as in Example 17 was used with no. 2 fuel oil and toluene in place of octane. Results are shown below:

| example | added hydrocarbon | g aqueous phase | % Mo in aqueous phase | g organic phase | ppm Mo in organic phase | % Mo in aqueous phase |
|---|---|---|---|---|---|---|
| 18 | no. 2 fuel oil | 18.2 | 2290 | 18.1 | 100 | 96 |
| 19 | toluene | 16.3 | 2040 | 21.4 | 330 | 86 |

These results indicate that aliphatic hydrocarbons are preferred to aromatic ones in this extraction process.

EXAMPLE 20

The procedure of Example 17 was repeated using carbon tetrachloride instead of octane as the water immiscible organic solvent. The extraction produced 15.9 gram of an aqueous phase containing 3140 ppm molybdenum and 20.2 grams of an organic phase which contained 220 ppm molybdenum. The aqueous phase contained 92% of the molybdenum.

EXAMPLE 21

The procedure of Example 17 was repeated using chlorobenzene instead of octane as the water immiscible organic solvent. The extraction produced 13.9 grams of an aqueous phase containing 3180 ppm molybdenum and 20.8 grams of an organic extract which contained 325 ppm molybdenum. The aqueous phase contained 88% of the molybdenum.

Examples 20 and 21 demonstrate that alkane hydrocarbon are more effective than halogenated hydrocarbons and hence the alkanes are preferred.

EXAMPLES 22-26

Additional experiments were conducted as in Example 17, but varying the material weight ratios, temperature, and contact time. The results shown below, in particular the molybdenum concentration remaining in the organic phase, indicate that contact time and temperature have relatively little effect on the efficiency of the extraction. In addition, as little as 25 wt% water versus TBA bottoms can be used without impairing extraction efficiency (Example 25), but less than an equal weight of octane versus TBA bottoms cannot be used without a significant loss of extraction efficiency (Example 26).

| Example # | g TBA Bottoms, H₂O, octane charged | extraction time & temperature | g aqueous phase | ppm Mo in aqueous phase | g organic phase | ppm Mo in organic phase | % Mo in aqueous phase |
|---|---|---|---|---|---|---|---|
| 22 | 12, 12, 12 | 10 min at 30° C. | 18.2 | 2000 | 17.9 | 130 | 94 |
| 23 | 12, 12, 12 | 30 min at 70° C. | 18.2 | 2210 | 17.2 | 73 | 97 |
| 24 | 12, 12, 12 | 30 min at 90° C. | 18.7 | 2310 | 16.1 | 22 | 99 |
| 25 | 16, 4, 16 | 10 min at 70° C. | 12.2 | 4370 | 23.6 | 72 | 97 |
| 26 | 12, 12, 6 | 10 min at 70° C. | 17.2 | 2370 | 11.6 | 225 | 94 |

EXAMPLE 27

Fifty grams each of molybdenum-containing TBA bottoms, octane, and water were well mixed for 10 minutes at 70° C. The separated aqueous phase were then used in the re-extraction of further equal weights of fresh distillation bottoms and octane. After four such cycles of reuse, the organic phases remaining in all cases contained less than 80 ppm molybdenum. Thus, the extract can be recycled with no loss of efficiency so long as octane is present.

What is claimed is:

1. In the process of separating and recovering dissolved molybdenum by extraction from a molybdenum-containing spent catalyst solution obtained when epoxide and alcohol are removed from a crude reaction mixture of a molybdenum catalyzed epoxidation reaction, the improvement comprises subjecting the spent catalyst solution to a liquid-to-liquid solvent extraction with an extracing medium consisting essentially of water and a water immiscible hydrocarbon or halogenated hydrocarbon organic solvent to form a two phase extraction system and then separating a molybdenum-rich aqueous phase extract from the organic phase extract.

2. The process according to claim 1 wherein the organic solvent is a normal or branched chain alkane hydrocarbon having 5 to 8 carbon atoms, benzene, alkyl substituted benzene having 1 to 10 carbon atoms in the alkyl moiety or mixtures thereof.

3. The process according to claim 1 wherein the organic solvent is octane or fuel oil.

4. The process according to claim 1 wherein the ratio of water to organic solvent which comprise the extraction medium is in the range of 1:20 to 20:1 parts by weight.

5. The process according to claim 1 wherein the ratio of extracting medium to spent catalyst solution is in the range of 0.25 to 10 parts of extracting medium per part of solution by weight.

6. The process according to claim 1 wherein the liquid-to-liquid solvent extraction is conducted at a temperature of 20° to 130° C. for a period of 1 to 30 minutes.

7. The process according to claim 1 wherein the spent catalyst solution is obtained by distillation of epoxide and alcohol from said crude reaction mixture.

8. The process according to claim 2 wherein the organic solvent is a normal or branched chain alkane hydrocarbon having 5 to 8 carbon atoms, benzene, alkyl substituted benzene having 1 to 10 carbon atoms in the alkyl moiety or mixtures thereof, the ratio of water to organic solvent which comprises the extraction medium is in the range of about 1:20 to 20:1 parts by weight, the ratio of extracting medium to spent catalyst solution is in the range of about 0.25 to 10 parts of extracting medium per part of solution by weight and the liquid-to-liquid solvent extraction is conducted at a temperature of about 20° to 130° C. for a period of about 1 to 30 minutes.

9. The process according to claim 8 wherein the organic solvent is octane.

10. The process according to claim 9 wherein the spent catalyst solution is obtained by distillation of the epoxided alcohol from said crude reaction mixture.

* * * * *

UNITED STATES PATENT OFFICE
CERTIFICATE OF CORRECTION

PATENT NO. : 4,315,896

DATED : February 16, 1982

INVENTOR(S) : Paul D. Taylor and Michael T. Mocella

It is certified that error appears in the above-identified patent and that said Letters Patent are hereby corrected as shown below:

Column 8, line 6, Claim 1 should read as follows:

".....with an extracting medium consisting....."

Column 8, line 34, Claim 8 should read as follows:

".....process according to claim 1 wherein the....."

Column 8, line 60, Claim 10 should read as follows:

".....epoxidized alcohol from said crude....."

Signed and Sealed this

First Day of June 1982

[SEAL]

Attest:

Attesting Officer

GERALD J. MOSSINGHOFF

Commissioner of Patents and Trademarks